United States Patent [19]

Beig

[11] 4,334,130
[45] Jun. 8, 1982

[54] GEAR SHIFTER MOUNTED ON STEERING COLUMN OF HEAVY-DUTY VEHICLE

[75] Inventor: Willy Beig, Friedrichshafen, Fed. Rep. of Germany

[73] Assignee: Zahnradfabrik Friedrichshafen, Friedrichshafen, Fed. Rep. of Germany

[21] Appl. No.: 180,348

[22] Filed: Aug. 22, 1980

[30] Foreign Application Priority Data

Aug. 25, 1979 [DE] Fed. Rep. of Germany ....... 2934473

[51] Int. Cl.³ .............................................. H01H 9/06
[52] U.S. Cl. ............................... 200/61.54; 180/336; 200/61.85; 200/157
[58] Field of Search ............... 200/61.85, 61.27–61.38, 200/61.54, 291, 153 T, 157, 4, 61.88, 6 A, 17 R, 18; 180/336

[56] References Cited

U.S. PATENT DOCUMENTS 2,007,084 7/1935 Haines .......................... 200/61.27 X
3,613,482 10/1971 Benson, Jr. et al. ............. 200/61.88

*Primary Examiner*—J. V. Truhe
*Assistant Examiner*—Morris Ginsburg
*Attorney, Agent, or Firm*—Karl F. Ross

[57] ABSTRACT

A gear shifter for an automotive vehicle, especially one of the heavy-duty type, comprises a shaft lever which is pivotally mounted on a supporting arm clamped to the vehicular steering column, the lever being swingable in a plane perpendicular to the column between three positions representing neutral, forward drive and reverse drive. A knob on the free end of the shift lever is rotatable about the longitudinal lever axis into four different angular positions representing as many speed ratios or "gears". Two sets of ball checks inside the shift lever serve to index that lever in any of its three pivotal positions and to index the knob in any of its four rotary positions. Two microswitches internally carried by the lever in the vicinity of its swing axis are operable by stationary cams in the "forward" and "reverse" positions, respectively, for transmitting corresponding commands to an electrical control system in the vehicular transmission; similar commands, establishing the several speed ratios, are emitted by four other microswitches which are grouped inside the lever about its longitudinal axis and are operable by cams carried on the rotary knob.

7 Claims, 3 Drawing Figures

GEAR SHIFTER MOUNTED ON STEERING COLUMN OF HEAVY-DUTY VEHICLE

FIELD OF THE INVENTION

My present invention relates to a manually operable gear shifter adapted to establish a plurality of forward and reverse speed ratios or "gears" for an automotive vehicle, especially one of the heavy-duty type using up to four such speed ratios in either direction of driving.

BACKGROUND OF THE INVENTION

Gear shifters of this character, having shift levers mounted on the vehicular steering column with two different kinds of motion for driving direction and speed ratio, are known from German Pat. No. 2,502,578 and German published application No. 1,804,125 for example. Conventional shift levers disposed in the vicinity of the steering wheel, however, are sometimes difficult to operate, especially with mechanical coupling to the gear transmission of the vehicle. With a large number of speed ratios, such as four in each direction, they often require large swing angles and their shift positions are not always readily ascertainable by the driver.

OBJECT OF THE INVENTION

The object of my present invention, therefore, is to provide an improved gear shifter of the type referred to which obviates the aforementioned drawbacks and is easy to set in any selected operating position while requiring only limited space for this purpose.

SUMMARY OF THE INVENTION

I realize this object, in accordance with the instant invention, by providing a hollow shift lever swingable on a pivot stud between three pivotal positions (forward, reverse and neutral), the stud extending substantially parallel to the vehicular steering column from a mounting member fixedly secured to that column and carrying first cam means positioned to operate a first and second microswitch inside the shift lever in the forward and the reverse position thereof, respectively. An extremity of the shift lever remote from the pivot stud is provided with a rotatable knob having a stem which projects into that extremity and carries second cam means positioned to operate a plurality of further microswitches in respective angular positions of the knob. A first pair of coacting detent members on the pivot stud and in the interior of the shift lever serve to index that lever in any of its pivotal positions; similarly, a second pair of coacting detent members on the stem of the knob and in the aforementioned lever extremity can index that knob in any of its several angular positions relative to the shift lever. With the aid of a set of conductors extending from the shift lever, advantageously as part of a flexible cable, the two first-mentioned microswitches respectively emit a first and a second command signal to conventional electrical control means in the vehicular gear transmission for establishing forward and reverse drive in the corresponding pivotal positions of that lever. The further microswitches in the knob-carrying lever extremity, similarly, emit additional command signals for establishing as many different speed ratios in respective angular knob positions.

BRIEF DESCRIPTION OF THE DRAWING

The above and other features of my invention will now be described in detail with reference to the accompanying drawing in which.

SPECIFIC DESCRIPTION

Figure 1:
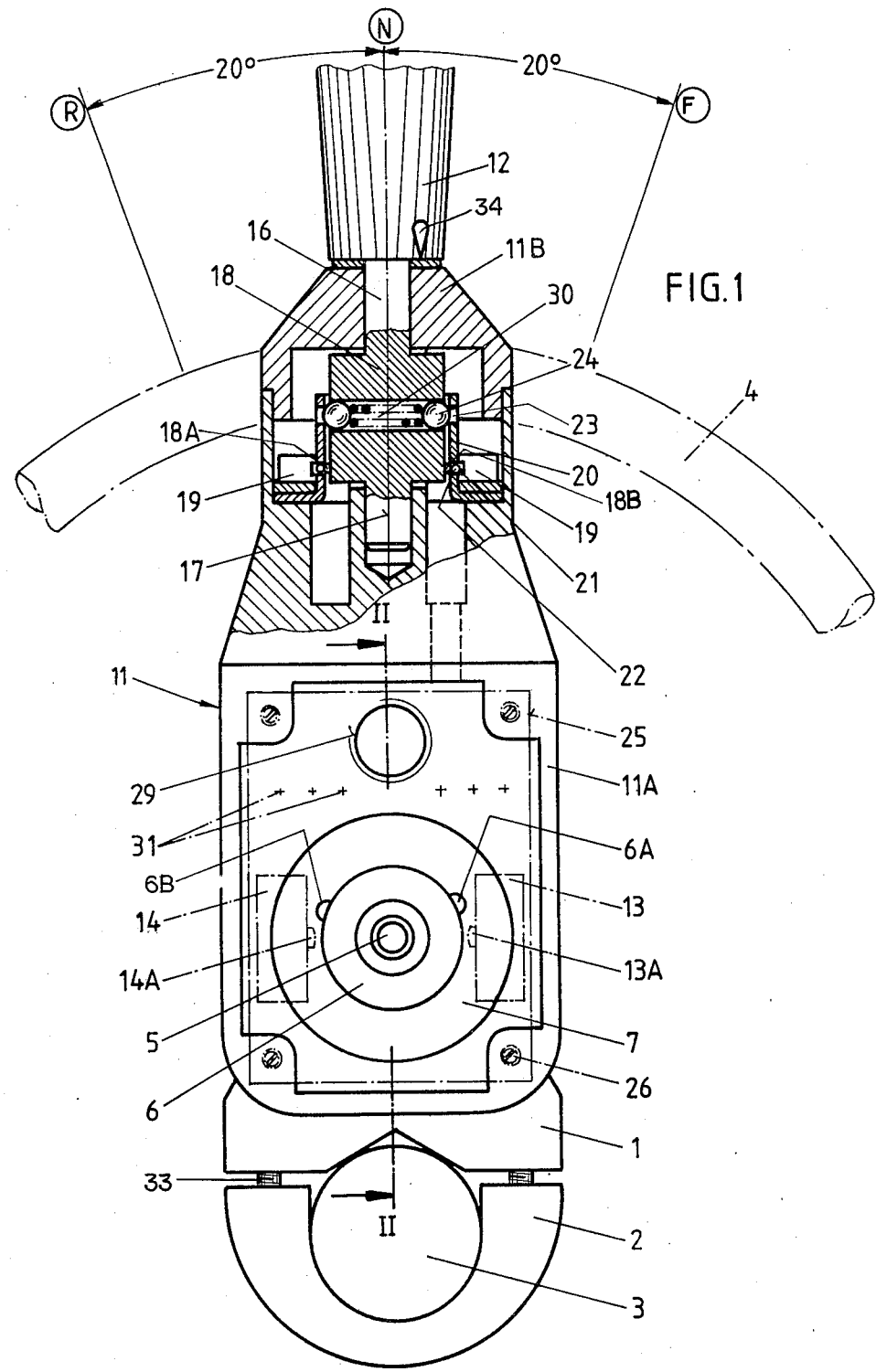
FIG. 1 is a part-sectional plan view of a gear shifter embodying my invention.

As shown in the drawing, a mounting arm 1 is clamped by a yoke 2 and screws 33 to a steering column 3 of a heavy-duty automotive vehicle, e.g. a bulldozer, not otherwise illustrated. A steering wheel 4 overlying the mounting arm 1 has been partly indicated in phantom lines in FIG. 1. A stud 5 fixedly rising from arm 1, parallel to column 3, serves as a pivot for a hollow shift lever 11 formed as a flat prismatic housing 11A in the vicinity of that stud, this housing merging into a tubular extremity 11B centered on a longitudinal axis 17. Extremity 11B carries a knob 12 rotatably lodged therein with the aid of a stem 16 centered on axis 17, this stem broadening into a cylindrical boss 18 within that extremity.

Figure 2:
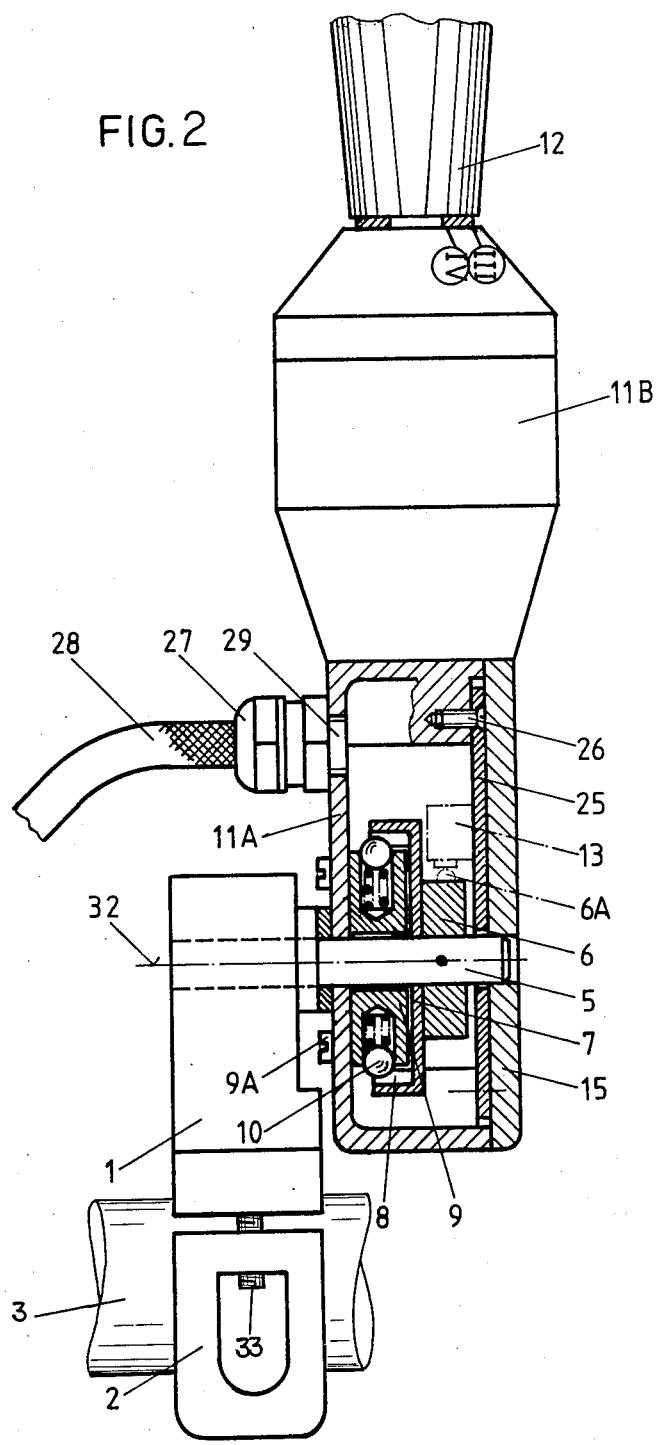
FIG. 2 is a side view of the gear shifter, partly in section on the line II—II of FIG. 1.

A hub 6 rigid with stud 5 inside housing 11A carries two peripherally spaced-apart radial projections 6A and 6B positioned to coact with respective microswitches 13 and 14 when lever 11 is swung out from its netural position "N" (FIG. 1) into a forward position "F" or a reverse position "R", respectively; the angular separation of these latter positions from mid-position "N" is shown to be about 20°. Microswitches 13 and 14 are mounted on a conductor plate 25 which is fastened to the lever by screws 26 and is overlain by a cover 15, both omitted in FIG. 1 in which the positions of these microswitches and plate 25 have been indicated in phantom lines. In FIG. 2 the switch 13 and the projection 6A cammingly engageable therewith have been shown, again in phantom lines, offset by 90° from the position they actually occupy when lever 11 is in its forward position "F".

The shift lever is releasably indexable in any of its three pivotal positions "F", "N" and "R" by a pair of coacting detent members 7 and 9. Member 9 is a disk secured to the bottom of housing 11A by screws 9A and provided with two diametrically opposite radial recesses accommodating respective spring-loaded ball checks 10. Member 7 is a cup fixedly secured to hub 6, and thus to stud 5, while coaxially embracing the disk 9; the rim of this cup is formed with three pairs of diametrically opposite inner notches 8 respectively engaged by ball checks 10 in these pivotal positions. Since the contact pressure of camming projections 6A and 6B on the associated microswitches is negligible, the operator needs to overcome only the spring pressure of the ball checks in order to swing the lever 11 into and out of driving positions "F" and "R" about the substantially vertical axis 32 of stud 5.

Figure 3:
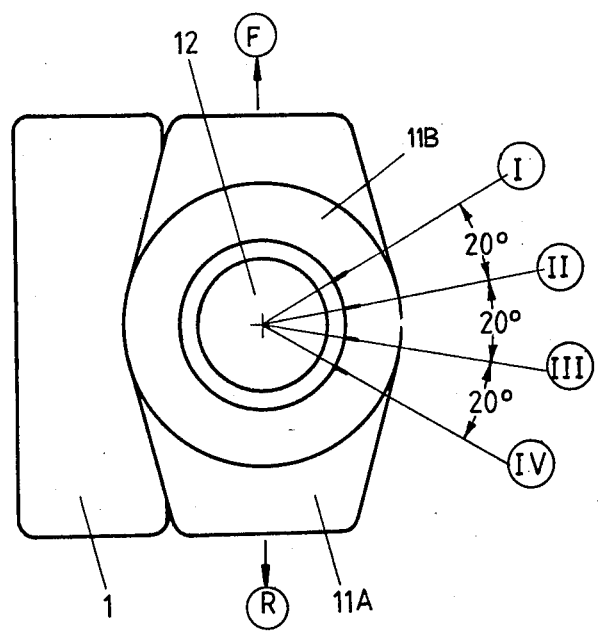
FIG. 3 is an end view as seen from the top of FIGS. 1 and 2.

Another pair of coacting detent members is formed by boss 18 and by a surrounding sheet-metal shroud 20, curved about its axis 17 over more than half a circle. Boss 18 has a diametrical bore 30 occupied by two spring-loaded spheres 24, similar to ball checks 10, which confront respective indentations (here shown as holes) 23 into which these spheres engage in four angular positions "I", "II", "III", "IV" corresponding to first, second, third and fourth gear. In these angular positions, spaced about 20° apart as seen in FIG. 3, four microswitches 19 (only two shown) are respectively actuated by two camming protrusions 18A and 18B radially projecting from boss 18 at locations so chosen that in each position one of these protrusions confronts one of four apertures 21 in shroud 20 occupied by mobile spherical bodies 22. Microswitches 19, which like shroud 20 are fixedly mounted in lever extremity 11B, are aligned with these apertures so that their contact elements are deflected by the corresponding spheres 22 upon displacement thereof by a protrusion 18A or 18B. The rotary position to knob 12 and thus of boss 18 is indicated to the driver by a pointer 34 confronting markings "I", "II", "III", "IV" on lever extremity 11B, the last two of these markings being visible in FIG. 2. To rotate the knob 12, the driver again needs to overcome only the spring pressure acting upon spheres 24.

The two microswitches 13, 14 in housing 11A and the four microswitches 19 in the tubular lever portion 11B are electrically connected by nonillustrated internal leads to respective terminals 31 on conductor plate 25. A coupling 27 threaded into a bore 29 of the housing bottom attaches a flexible cable 28 to lever 11, the conductors of this cable extending through bore 29 into housing 11A where they are joined to the terminals 31 in order to convey the command signals emitted by the corresponding microswitches to the control circuit of the vehicular gear transmission. Cable 28 is spaced from pivot stud 5 by a distance sufficient to prevent any interference with the swing of lever 11.

Although a single indexing ball 10 or 24 would suffice in either of the two pairs of detent members, the use of two (or possibly more) such balls reduces wear and provides increased stability. The balls, therefore, can be made small enough to allow for the relatively close spacing (about 20°) of the several lever and knob positions described above.

I claim:

1. A gear shifter for an automotive vehicle provided with a steering column and further provided with a gear transmission including electrical control means responsive to first and second command signals for establishing forward and reverse drive, respectively, and to a plurality of additional command signals for establishing as many different speed ratios in either driving direction,
comprising:
   a mounting member fixedly securable to said steering column and provided with a pivot stud orientable substantially parallel to said column;
   a hollow shift lever swingable on said pivot stud between three pivotal positions including a forward position, a reverse position and an intermediate neutral position;
   a first pair of coacting detent members on said pivot stud and in the interior of said shift lever for releasably indexing the latter in any of said pivotal positions;
   a knob rotatably mounted on an extremity of said shift lever remote from said pivot stud, said knob having a stem extending into said extremity;
   a second pair of coacting detent members on said stem and in said extremity for releasably indexing said knob in any of a plurality of angular positions relative to said shift lever;
   first cam means on said pivot stud;
   a first and a second microswitch inside said shift lever positioned for operation by said first cam means in said forward position and in said reverse position for emitting said first and said second command signal, respectively;
   second cam means on said stem;
   a plurality of further microswitches in said extremity positioned for operation by said second cam means in respective angular positions of said knob for emitting said additional command signals; and
   conductor means extending from said shift lever for carrying said command signals to said control means.

2. A gear shifter as defined in claim 1 wherein said first pair of detent members comprises a disk rigid with said shift lever provided with at least one radial recess and a cup on said pivot stud coaxially embracing said disk, said cup having inner peripheral notches engageable by a spring-loaded ball check lodged in said recess.

3. A gear shifter as defined in claim 2 wherein said first cam means comprises a hub rigid with said cup having a pair of peripherally spaced-apart radial projections respectively engageable with said first and second microswitches.

4. A gear shifter as defined in claim 1, 2 or 3 wherein said second pair of detent members comprises a cylindrical boss integral with said stem, said boss having a diametrical bore occupied by two spring-loaded spheres and a shroud coaxially curved about said boss with peripherally spaced-apart indentations engageable by said spheres, said shroud being internally secured to said shift lever.

5. A gear shifter as defined in claim 4 wherein said second cam means comprises a plurality of peripherally spaced-apart radial protrusions on said boss and a set of mobile bodies in apertures of said shroud displaceable by said protrusions into engagement with said further microswitches respectively aligned therewith.

6. A gear shifter as defined in claim 5 wherein said mobile bodies are balls.

7. A gear shifter as defined in claim 1 wherein said conductor means comprises a flexible cable bypassing said mounting member and avoiding said steering column.

* * * * *